United States Patent
Bui et al.

(10) Patent No.: US 8,891,198 B2
(45) Date of Patent: Nov. 18, 2014

(54) METHOD AND APPARATUS FOR OPERATING A TAPE STORAGE DEVICE

(71) Applicant: International Business Machines Corporation, Armonk, NY (US)

(72) Inventors: Nhan X. Bui, Tucson, AZ (US); Giovanni Cherubini, Rueschlikon (CH); Jens Jelitto, Rueschlikon (CH); Angeliki Pantazi, Rueschlikon (CH); Kazuhiro Tsuruta, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/947,843

(22) Filed: Jul. 22, 2013

(65) Prior Publication Data
US 2014/0029130 A1     Jan. 30, 2014

(51) Int. Cl.
| G11B 5/584 | (2006.01) |
| G11B 20/20 | (2006.01) |
| G11B 15/48 | (2006.01) |
| G11B 15/18 | (2006.01) |
| G11B 15/60 | (2006.01) |
| G11B 5/58 | (2006.01) |
| G11B 20/10 | (2006.01) |

(52) U.S. Cl.
CPC .......... *G11B 15/1808* (2013.01); *G11B 15/602* (2013.01); *G11B 5/58* (2013.01); *G11B 20/10388* (2013.01)
USPC ......................... 360/77.12; 360/76; 360/74.1

(58) Field of Classification Search
None
See application file for complete search history.

(56) References Cited

U.S. PATENT DOCUMENTS

| 4,996,609 | A | 2/1991 | Joannou |
| 5,229,895 | A | 7/1993 | Schwarz et al. |
| 6,430,008 | B1 | 8/2002 | Trabert et al. |
| 7,957,088 | B1 | 6/2011 | Bui et al. |
| 7,961,421 | B1 | 6/2011 | Bui et al. |
| 2002/0163752 | A1* | 11/2002 | Peterson .......................... 360/76 |
| 2006/0103968 | A1* | 5/2006 | Jurneke ............................ 360/76 |
| 2007/0230033 | A1* | 10/2007 | McAllister et al. ......... 360/77.12 |
| 2007/0285831 | A1 | 12/2007 | Goker et al. |
| 2009/0097153 | A1* | 4/2009 | Day ................................ 360/76 |

(Continued)

FOREIGN PATENT DOCUMENTS

WO      2011077340 A1      6/2011

OTHER PUBLICATIONS

UK Search Report; Intellectual Property Office; Application No. GB1213366.6; Patents Act 1977: Search Report under Section 17(5); Date Mailed: Nov. 27, 2012, pp. 1-3.

*Primary Examiner* — Andrew L Sniezek
(74) *Attorney, Agent, or Firm* — Cantor Colburn LLP (57) ABSTRACT

In a method for operating a tape storage device comprising a tape head for reading and/or writing data from/to a tape in the tape storage device, a first tape skew value concerning a skew of the tape is determined and the first tape skew value is converted into a first skew control signal by means of a skew feedback controller. A second tape skew value concerning the skew of the tape is determined, and the second tape skew value is converted into a second skew control signal by a feed-forward controller. At least one compensation signal for the second skew control signal is determined, and at least one of a rotational orientation of the tape head and a tape motion direction of the tape is controlled dependent on the second skew control signal and the compensation signal in case the first skew control signal fails.

19 Claims, 7 Drawing Sheets

(56) References Cited

U.S. PATENT DOCUMENTS

2009/0213489 A1 8/2009 Bui et al.
2010/0315740 A1 12/2010 Bates et al.
2011/0199701 A1 8/2011 Bui et al.

* cited by examiner $$\overset{\triangle}{AB\Gamma}: \quad \sin\theta = \frac{d_{B\Gamma}}{d_{AB}} = \frac{y_x(t_2) - y_x(t_1)}{v \cdot \Delta t} \quad \text{(F0)}$$

METHOD AND APPARATUS FOR OPERATING A TAPE STORAGE DEVICE

PRIORITY

This application claims priority to Great Britain Application No. 1213366.6, filed Jul. 27, 2012, and all the benefits accruing therefrom under 35 U.S.C. §119, the contents of which in its entirety are herein incorporated by reference.

BACKGROUND

The present invention relates to an apparatus and to a method for operating a tape storage device, and to a related computer program product.

In tape storage devices data typically is written to and read from a tape inserted into a tape drive of the tape storage device. The tape may be preformatted into data bands and servo bands extending next to each other in a motion direction of the tape. While the data bands provide data tracks for writing data to, the servo bands comprise prerecorded servo patterns, also denoted in a more general way as servo information, which servo information may be read by a reading element of the tape head for gaining information about a lateral position of the tape with respect to a reference position. Lateral in this context is meant orthogonal to a reference motion direction of the tape. A deviation of the lateral position from the reference position detected with the aid of the read element is also denoted as position error signal PES in this technical field. Such information, and specifically the PES, may be provided to a feedback controller, also denoted as lateral position feedback controller which converts the PES into a control signal for a realigning between the tape head and a data track currently read or written and specifically its track centerline for enabling a correct reading and writing of data. As a result, a closed-loop control system for a continuing alignment of the tape head and the tape is provided which is also denoted as closed-loop track-follow control system.

One of the key challenges for such a closed-loop track-follow control system originates from lateral vibrations of the tape. In traditional tape paths, flanged rollers are used for constraining a lateral tape motion during a transport of the tape from a supply reel to a take-up reel. Although the use of flanged rollers constrains the tape and limits lateral tape motion during operation, debris accumulation may be introduced at the flanges that not only may affect the lifetime of the tape, but may also create undesirable dynamic effects due to a contact of the tape edge with guiding elements such as flanges. These effects may be alleviated by removing the flanges from the rollers and operating the tape path without guiding elements.

However, such approach may introduce new challenges: Removing the guiding elements also removes a constraint on the lateral motion of the tape, which may result in an increase in amplitude of a typically low-frequency lateral tape motion. Specifically, an effect denoted as stack shift may become more prominent. Stack shifts are due to tape-stacking irregularities in the cartridge reel and lead to lateral tape motion events during normal operation of the drive. In general, stack shifts appear as high-amplitude low-frequency disturbances that can repeatedly be observed at the same longitudinal position when using the same cartridge.

An increased amplitude of a lateral tape motion may in addition increase a tape skew which in turn may degrade the performance of the tape storage device.

SUMMARY

In one embodiment, an apparatus for operating a tape storage device, includes a first tape skew determination unit configured to provide a first tape skew value concerning a skew of a tape in the tape storage device; a second tape skew determination unit configured to provide a second tape skew value concerning the skew of the tape; an actuator for adjusting one or more of: a rotational orientation of a tape head of the tape storage device, which tape head is provided to read and/or write data from/to the tape, and a motion direction of the tape; a skew feedback controller configured to convert a deviation of the first tape skew value from a reference skew value into a first skew control signal to control the actuator; a feed-forward controller configured to convert the second tape skew value into a second skew control signal configured to control the actuator; and a compensator configured to determine at least one compensation signal for the second skew control signal.

In another embodiment, a method for operating a tape storage device comprising a tape head for reading and/or writing data from/to a tape in the tape storage device includes determining a first tape skew value concerning a skew of the tape and converting the first tape skew value into a first skew control signal by means of a skew feedback controller; determining a second tape skew value concerning the skew of the tape, and converting the second tape skew value into a second skew control signal by means of feed-forward controller; determining at least one compensation signal for the second skew control signal; and controlling at least one of: a rotational orientation of the tape head, and a tape motion direction of the tape, dependent on the second skew control signal and the compensation signal in case the first skew control signal fails.

BRIEF DESCRIPTION OF THE SEVERAL VIEWS OF THE DRAWINGS

The invention and its embodiments will be more fully appreciated by reference to the following detailed description of illustrative embodiments in accordance with the present invention when taken in conjunction with the accompanying drawings.

DETAILED DESCRIPTION

According to an embodiment of one aspect of the invention, an apparatus for operating a tape storage device is provided, the apparatus comprising a first tape skew determination unit for providing a first tape skew value concerning a skew of a tape in the tape storage device and a second tape skew determination unit for providing a second tape skew value concerning the skew of the tape. An actuator is provided for adjusting one or more of a rotational orientation of a tape head of the tape storage device, which tape head is provided for reading and/or writing data from/to the tape, and a motion direction of the tape. A skew feedback controller is provided for converting a deviation of the first tape skew value from a reference skew value into a first skew control signal for controlling the actuator, a feed-forward controller is provided for converting the second tape skew value into a second skew control signal for controlling the actuator, and a compensator is provided for determining at least one compensation signal for the second skew control signal.

In embodiments, the apparatus may comprise one or more of the following features: the compensator is adapted to add the at least one compensation signal to the second skew control signal in case of the first skew control signal failing; the compensator is adapted to determine an average of the first skew control signal, and the at least one compensation signal is dependent on the average of the first skew control signal, and on a most recent value of a moving average of the first skew control signal that is determined by the compensator; the compensator is adapted to determine a first moving average of the first skew control signal for a forward direction of the tape motion, and a second moving average of the first skew control signal for a reverse direction of the tape motion, and the at least one compensation signal is dependent on the first moving average of the first skew control signal for the forward direction of the tape motion, and the second moving average of the first skew control signal for the reverse direction of the tape motion; the compensator is adapted to determine a third tape skew value by means of evaluating a time difference between an detection of synchronization information on multiple different data channels, and the at least one compensation signal is dependent on the third tape skew value;

The first tape skew determination unit is adapted to determine the first tape skew value based on servo information read from at least two servo bands of the tape, which servo information is prewritten to the at least two servo bands for allowing to determine a lateral position of the tape, the determined first tape skew value represents a skew angle between the motion direction of the tape and a rotational orientation of the tape head, the second tape skew determination unit is adapted to determine the second tape skew value by means of servo information read from a single servo band of the tape, which servo information is prewritten to the servo band for allowing to determine a lateral position of the tape, and the determined second tape skew value represents a skew angle between the motion direction of the tape and a reference motion direction of the tape; the skew feedback controller, the first tape skew determination unit and the actuator contribute to a closed-loop skew control system, a transfer function of the feed-forward controller that is based on an inverse transfer function of a model of the actuator, and a skew control signal for the actuator that is dependent on the first skew control signal added to the second skew control signal; the second tape skew determination unit comprises a subunit for estimating a lateral tape position by means of a model of a lateral position actuator for controlling a lateral position of the tape head, and for determining a moving average of the estimated lateral tape position, and the at least one compensation signal is dependent on at least two consecutive moving average of the estimated lateral tape positions.

The second tape skew determination unit comprises an optical detector for estimating a lateral position of the tape, and a subunit for determining a moving average of the estimated lateral tape position, and the at least one compensation signal is dependent on at least two consecutive moving average estimated lateral tape positions.

According to an embodiment of another aspect of the present invention, a method is provided for operating a tape storage device comprising a tape head for reading and/or writing data from/to a tape in the tape storage device, the method comprises determining a first tape skew value concerning a skew of the tape and converting the first tape skew value into a first skew control signal by means of a skew feedback controller, determining a second tape skew value concerning the skew of the tape, and converting the second tape skew value into a second skew control signal by means of feed-forward controller. At least one compensation signal is determined for the second skew control signal, and at least one of a rotational orientation of the tape head and a tape motion direction of the tape is controlled dependent on the second skew control signal and the compensation signal in case the first skew control signal fails.

In embodiments, the method may comprise one or more of the following features: determining an average of the first skew control signal during operation of a control loop comprising the skew feedback controller, and wherein the at least one compensation signal is dependent on the average of the first skew control signal; storing the average of the first skew control signal at unload of a tape cartridge from a tape drive of the tape storage device, and at load of a tape cartridge into the tape drive setting the at least one compensation signal to the stored average of the first skew control signal; determining a third tape skew value by means of evaluating a time difference between an detection of synchronization information on multiple different data channels, and determining the at least one compensation signal dependent on the third tape skew value; writing data to the tape, determining one or more of an error rate and a signal to noise ratio when reading the data written to the tape, and determining the at least one compensation signal dependent on a tape skew value at a position of the tape at which either the error rate is minimized or the signal to noise ratio is maximized.

According to an embodiment of another aspect of the present invention, a computer program product is provided comprising a computer readable medium having computer readable program code embodied therewith, the computer readable program code comprising computer readable program code configured to perform a method according to any one of the preceding embodiments.

It is understood that method operations may be executed in a different order than listed in a method claim. Such different order shall also be included in the scope of such claim as is the order of operations as presently listed.

Embodiments described in relation to the aspect of an apparatus shall also be considered as embodiments disclosed in connection with any of the other categories such as the method, the computer program product, etc.

In the figures, same or similar elements are denoted by the same reference signs.

As an introduction to the following description, it is first pointed at a general aspect of the invention, concerning a skew compensation mechanism in a tape storage device.

A proper operation of a tape storage device which includes proper reading and/or writing data from/to a tape medium (in following denoted as tape) inserted into a tape drive of the tape storage device at high densities is inter alia dependent on a high precision alignment of a tape head of the tape storage device and the tape which tape head comprises read elements for reading data from the tape and write elements for writing data to the tape. Two effects can be observed in this context which may impair an operation of the tape storage device:

The first effect refers to a lateral displacement of the tape. Generally, the lateral displacement may be expressed as a deviation of the tape either with respect to a reference lateral tape position or with respect to a lateral position of the tape head. For determining any deviation, the current lateral tape position is measured which shall include any indirect determination of the lateral tape position. Any change of the lateral tape position over time is referred to as lateral tape motion.

Another effect is skew which skew equally may impact the operation of the tape storage device. Skew is generally understood as a rotational displacement of the tape, which rotational displacement occurs in a plane of the tape. In general, skew may represent an angle between a tape motion direction and a reference tape motion direction, or may represent an angle between the tape motion direction and a rotational orientation of the tape head, i.e. an orientation defined in a plane parallel to the plane of the tape. It is explicitly stated that the term "skew" shall refer to both variants, i.e. to an absolute skew as referred to in the above first variant, and to a relative skew as referred to in the above second variant. For determining any skew, the tape motion direction may be determined, which shall include measuring or any indirect determination of the tape motion direction. Hence, skew as such shall refer to both the rotational displacement of the motion direction of the tape versus the rotational orientation of the tape head, and to the rotational displacement of the motion direction of the tape versus a reference motion direction of the tape. The reference motion direction of the tape may be considered as a direction the tape ideally moves across the tape head given that the tape head is ideally oriented. The reference motion direction is orthogonal to the ideal orientation of the tape head, and in absolute terms is parallel to an ideal tape path envisaged by rollers, flanges etc. in the tape storage device.

Figure 1:
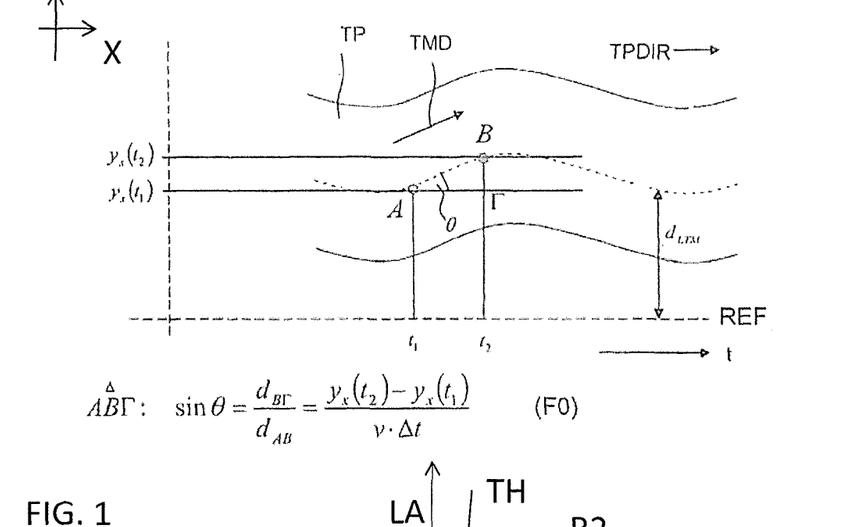
FIG. 1 illustrates a tape motion path.

In this context, FIG. 1 illustrates skew and lateral displacement effects in a diagram representing a lateral tape motion direction TMD over time t. A tape TP is moved in a tape storage device from one reel to another reel during operation for allowing a tape head of the tape storage device to read and/or write data from/to the tape TP. In the diagram of FIG. 1, a lateral position $y_x(t)$ of a centerline of the tape TP is shown over time t as a dotted curve. The determined lateral tape position $y_x(t)$—also referred to as DLP—varies over time t due to lateral tape motion introduced by lateral disturbances as for example stack shifts. Since the lateral position $y_x(t)$ presently is scaled with respect to a reference lateral position REF which in the present case is $y_x=0$, the lateral tape position $y_x(t)$ at the same time represents a lateral displacement $d_{LTM}(t)$. If the reference lateral position REF indicates also a reference position for the tape head, the difference between DLP and the tape head lateral position is referred to as position error signal PES(t) over time t.

Hence, the displacement $d_{LTM}(t)$ over time t is shown by the dotted curve. Specifically, the tape centerline moves in Y-direction between first time $t_1$ and second time $t_2$ from A to B. As a result of such lateral displacement $d_{LTM}(t2)-d_{LTM}(t1)=y_x(t2)-y_x(t1)$ of the tape TP, a rotational displacement is introduced, too, which may be referred to by the arrow indicating the tape motion direction TMD. The current tape motion direction TMD as a result deviates from a reference tape motion direction TPDIR indicated by another arrow.

In this example, a skew of the tape TP may be represented by an absolute tape skew angle θ as the angle between the current tape motion direction TMD and the reference tape motion direction TPDIR, which in the present example is in parallel to a longitudinal direction X which typically represents the longitudinal extension of the tape TP in an ideal state. The absolute tape skew angle θ can be determined, for example, by means of the Formula F0 as shown in FIG. 1, wherein $y_x(t)$ denotes lateral displacements of the tape TP measured at consecutive points in time $t_1$ and $t_2$, while v denotes the velocity of the tape, and $\Delta t = t_2 - t_1$. Hence, within the scope of a tape skew estimation in a tape skew determination unit, which in the following will be denoted as second tape skew determination unit DUS2, at least two consecutive current lateral tape positions of the tape with respect to a predetermined reference point are determined at a predetermined longitudinal capture position. At a first point of time $t_1$, a lateral tape position $y_x(t_1)$ is determined at a predetermined longitudinal capture position. At a second point of time $t_2$ a further lateral tape position $y_x(t_2)$ is determined at the same predetermined longitudinal capture position. Alternatively or additionally, both lateral tape positions $y_x(t_1)$, $y_x(t_2)$) may be derived from particular lateral positions $d_y$, derived from the position error signal PES. The particular lateral position $d_y$ represents a corresponding lateral tape position. The tape skew θ may then be derived by using equation F0 in FIG. 1, which represents a trigonometrical relation of triangle ABΓ. A first triangle side $d_{B\Gamma}$ represents the lateral distance between both determined lateral tape positions $y_x(t_1)$, $y_x(t_2)$. A second triangle side $d_{AB}$ represents a distance in tape motion direction TMD, which results from the current tape velocity v and a time difference Δt. The time difference Δt represents a time lag between the first and the second point of time $t_1$, $t_2$.

Figure 2:
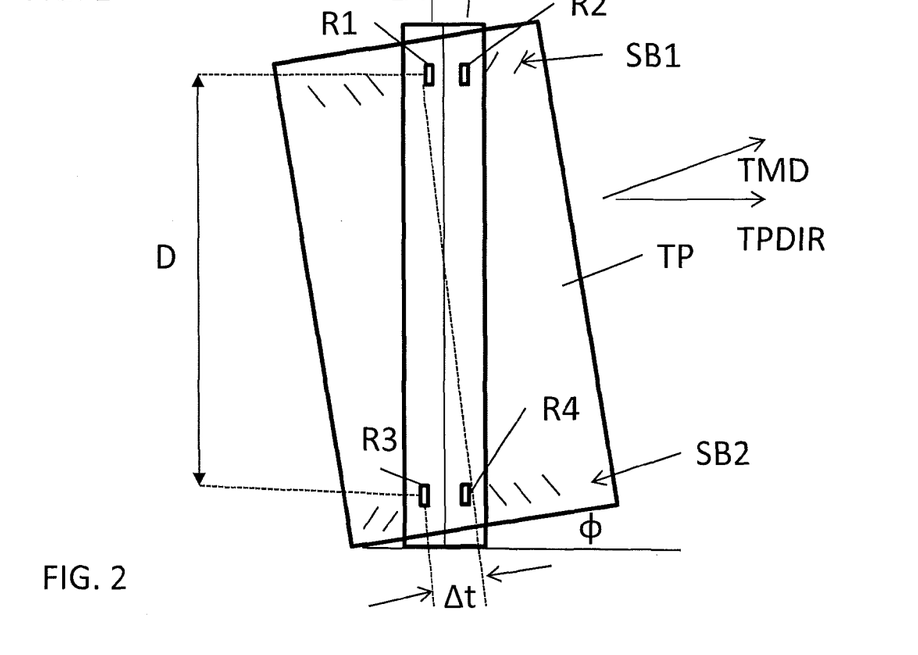
FIG. 2 is a cutout of a tape skewed with respect to a tape head in a top view.

The servo information that is prewritten on servo bands of the tape TP and read by a servo reader may be used for determining a lateral position $y_x(t)$ of the tape TP. Servo bands represent longitudinal bands on the tape TP—i.e. in X-direction according to FIG. 1—which alternate with data bands on the tape TP. There may be two or more servo bands provided on the tape TP. Each servo band contains servo patterns which are prerecorded. During operation of the tape storage device, the servo patterns of at least one servo band are read by a read element of a tape head the tape TP is moved across. The information inherent in the servo patterns and read by a read element—which read element may be solely dedicated for reading the servo pattern but not any data and as such may also be referred to as servo element—allows to determine a lateral position of the tape when crossing the servo read element. In FIG. 2, a cutout of a tape TP is shown with two servo bands SB1 and SB2 at the edges of the tape TP. Each servo band SB1 and SB2 contains servo patterns with sequences of parallel magnetically oriented stripes of different azimuth slopes. These servo patterns may follow a technology called timing-based servo TBS. In TBS systems, recorded servo patterns comprise of transitions with two different azimuthal slopes. The tape head lateral position is derived from the relative timing of pulses generated by a servo reader reading the servo pattern. The servo patterns may, for example, be written on five dedicated servo bands that straddle four data bands. The complete format for linear tape open LTO tape drives of the first generation was standardized by the European Computer Manufacturers Association (ECMA) in 2001 as ECMA-319. Reference is made to this source for gaining more insight about the timing based servo patterns.

Figure 3:
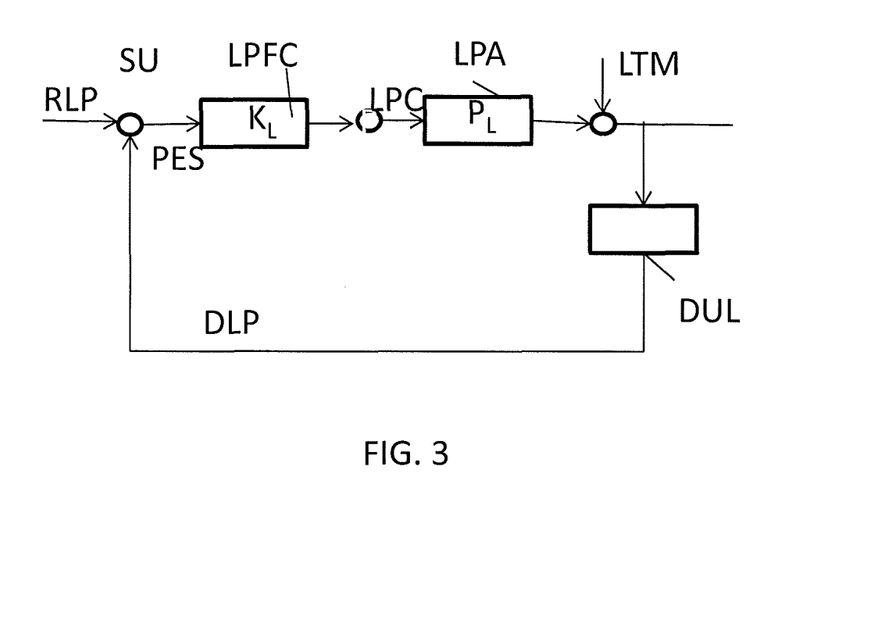
FIG. 3 is a block diagram of a closed-loop lateral position control system as used in an exemplary embodiment of the present invention.

Hence the servo pattern of a servo band is read by a servo reader. The information read allows for determining the lateral position of the tape, with reference to a lateral reference position. Reference is now made to the block diagram of FIG. 3 which inter alia shows a closed-loop lateral position control system as used in an embodiment of an apparatus of the present invention. The servo reader and additional logic or software for evaluating the servo reading results are summarized as lateral position determination unit DUL for measuring/determining a lateral position DLP of the tape TP with respect to the actuator LPA. A deviation PES between the determined lateral position DLP and a reference lateral position RLP is determined in subtracting unit SU. The deviation PES over time t is referred to as the position error signal PES(t), which illustrates a magnitude of a misalignment of the tape head relative to the tape. The position error signal PES is typically fed to a lateral position feedback controller LPFC—which is also denoted as track-follow controller in some instances—for converting the position error signal PES into a lateral position control signal LPC for a lateral position actuator LPA. The lateral position actuator LPA repositions the tape head by means of a head actuator in response to the lateral position control signal LPC for continuously following the data tracks in the presence of lateral tape motion disturbances LTM. Hence, the measured/determined lateral position DLP is used to continuously realign the tape head with the tape, which specifically includes a realignment of read and write elements of the tape head with assigned track centerlines of data tracks of the tape. Such mode is also denoted as track following mode. The feedback controller transfer function $K_L$ may be based on PID, lead-lag or more advanced optimal control designs, while a sample transfer function $P_L$ of the lateral position actuator may be based on a simple second order system.

Summarizing, storage media typically comprise servo information prerecorded in one or more of dedicated servo bands that extend next to data tracks for storing data, which servo bands extend in a longitudinal direction along the tape. A servo band typically is read by at least one dedicated servo reader of a tape head of a tape drive, into which a cartridge containing the tape media is inserted to. The servo information read from at least one servo band allows for determining a lateral deviation of the tape. A position error signal supplied by one or more of the servo readers may be translated into a control signal for the lateral position actuator for controlling the lateral position of the tape head with respect to the tape. A positioning accuracy of the track-follow control system may have impact on the density data can be written to tape since the displacement allowed finally determines the density at which tracks can be packed onto the tape.

In an exemplary embodiment, the servo patterns prerecorded on the tape may additionally be used for determining a skew of the tape, and specifically for determining a skew of the tape relative to the tape head. This concept is illustrated in FIG. 2: A cutout of a skewed tape TP is shown which moves in motion direction TMD, which is displaced by skew angle φ from a reference motion direction TPDIR and from an alignment of a tape head TH the tape TP crosses. In the present example the tape head TH with its rotational orientation LA is perfectly orthogonally aligned with respect to the reference motion direction TPDIR of the tape TP. However, the orientation LA of the tape head TH is rotationally misaligned with respect to the current tape motion direction TMD by skew angle φ. On the tape edge, the two servo bands SB1 and SB2 are provided as explained above. The tape head TH comprises read elements R1, R2 for reading the pattern of the first servo band SB1 and read elements R3, R4 for reading the patterns of the second servo band SB2. A distance between the read elements R1 and R3 or R2 and R4 respectively for reading the two servo bands SB1 and SB2 is denoted as distance D, which at the same time should be a distance between the two servo bands SB1 and SB2. According to the formula $$\Phi = \arctan(v\Delta t/D) \tag{F1}$$

by means of reading consecutive information from the two servo bands SB1 and SB2, the relative skew angle φ between the tape TP and the tape head TH may be determined, wherein Δt denotes the time interval between a longitudinal position information of the servo pattern on the second servo band SB2 being read by the servo reader R3 and the same longitudinal position information of the servo pattern on the first servo band SB1 being read by the servo reader R1. v again denotes the velocity of the tape TP at which the tape TP is moved across the tape head TH.

The above findings may be implemented in a determination unit referred to as first tape skew determination unit DUS1 in the following, see the block diagram of FIG. 4. Hence, the first tape skew determination unit DUS1 may be considered as sensor or measuring unit for identifying the current skew of the tape, which skew in this example is a relative skew Φ between the current tape motion direction TMD and the current rotational orientation LA of the tape head TH, since the servo readers of the tape head may in this example only derive the relative skew from the servo patterns while a misalignment of the tape head itself is unknown to such detection system. By means of such first tape skew determination unit DUS1, a first tape skew value DTS1 may be determined. Such first tape skew value DTS1 may in this example be determined from the reading of servo information from two servo bands as introduced above. Such first tape skew value DTS1 may represent a relative skew angle Φ between the tape TP and the tape head TH for the reason that the information for determining the tape skew is read by the tape head which does not know about its own possible displaced orientation. However, the first tape skew value may be determined in a different way such that the first tape skew determination unit may include other means for determining skew of the tape, be it as absolute measure or as relative measure.

The determined first tape skew value DTS1 may be used in a closed-loop skew control system for controlling a suitable skew actuator SA for adjusting the skew in dependency from the determined first tape skew value DTS1. Such a sample closed-loop control system is illustrated in FIG. 4. In a subtracting unit SU the first tape skew value DTS1 is subtracted from a reference tape skew value RS which—for the reason that the first tape skew value DTS1 in the present embodiment is a skew measure relative to the rotational orientation of the tape head TH—may for example be set to 0 degrees. The skew error signal SES consequently represents a deviation of the first tape skew value DTS1 from the reference tape skew value RS such that a skew feedback-controller SFC with a transfer function $K_s$ may convert the deviation information inherent in the SES signal into a first skew control signal SC1 that is fed to a skew actuator SA. The skew actuator SA which may have a transfer function $P_s$ and adjusts the tape skew such that the tape motion direction TMD and the rotational orientation of the tape head TH will become better aligned again. In the block chart of FIG. 4, the signal Ds denotes disturbances that may impact the tape motion direction TMD, and that—in a closed-loop skew control system as presently provided—may impact an adjusted skew such that such new skew deviations may be sensed by the first tape skew determination unit DUS1, which deviations again are manifested in the SES signal.

The skew actuator SA may be an actuator acting on a rotational orientation of the tape head. In such embodiment, the tape head TH may have a rotational bearing, and a rotational position of the tape head TH with respect to the tape TP may be modified by actuating the skew actuator SA. Hence, by the skew actuator SA, the rotational head position θ of the tape head TH may be controlled in a plane predetermined by the longitudinal direction X and the lateral direction Y, see FIG. 2-*dependent* on the first skew control signal SC1. The skew actuator SA acting on the rotational position of the tape head TH may also be operable to control the lateral tape head position as is needed in the closed-loop lateral position control system of FIG. 3, and as such also embody the lateral position actuator LPA of FIG. 3.

Figure 7:
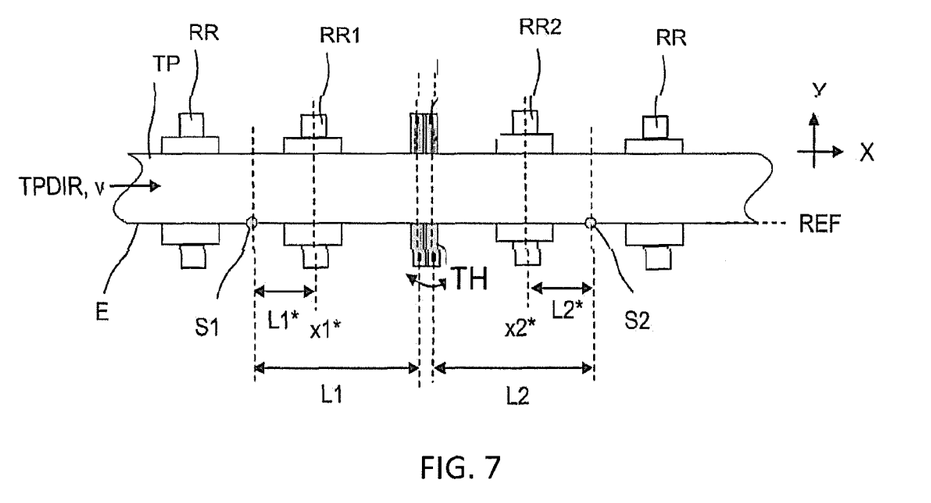
FIG. 7 is a tape path in a tape drive as used in an exemplary embodiment of the present invention.

However, the skew actuator SA may act on other means, too. The skew actuator SA may also act on a tilting of rollers as will be explained in connection with FIG. 7. FIG. 7 illustrates a lateral extension of a tape path. A tape TP may move in a forward direction along a longitudinal direction X. The forward direction represents a reference tape transport direction TPDIR along the longitudinal direction X where the tape TP passes for example the tape head TH. A reverse direction of the tape TP is reversed with respect to the forward direction. The tape TP is inserted in a tape drive which tape drive is controlled for moving for the tape back and forth. The tape TP in motion is supported by a first and a second tape roller RR1, RR2 positioned next to the tape head TH on opposite sides of the tape head TH in longitudinal direction X. The first and the second tape roller RR1, RR2 are directly in contact with the tape TP and may, in this example, be operable to actively tilt the tape TP dependent on the predetermined first skew control signal. For that purpose, the first and second tape rollers RR1, RR2 may be operable to tilt in longitudinal direction X. The first and second tape rollers RR1, RR2 are also identified as tilting elements. The storage device may comprise the skew actuator SA being operable to control the rotational position of the tape TP and/or at least one tilting element being operable to tilt the tape TP. Additional tape rollers RR may be associated to the tape path, wherein all tape rollers RR, RR1, RR2 for example, may be flangeless rollers. The tape head TH may in one embodiment comprise at least a first and a second head module with each head module comprising at least one read and one write element and at least one servo element.

In case the first determination unit as described above relies on reading servo information from two servo bands concurrently for determining the current skew, both associated servo channels need to be active. A failure in reading at least one of the two servo bands may lead to the skew following control not providing the desired control of the skew.

Therefore, the second tape skew determination unit DUS2 is provided. The second tape skew determination unit DUS2 may determine a skew related measure—be it related to absolute skew or to relative skew—such that the actuator SA is controlled subject to both the output of the first tape skew determination unit DUS1, i.e. the first tape skew value DTS1, and the output of the second tape skew determination unit DUS2, i.e. a second tape skew value DTS2, such that on the one hand the overall performance of the skew control is enhanced, and at the same time a fail-safe mechanism is introduced since the skew control may continue to be operable even if one of the tape skew determination units DUS1, DUS2 and/or underlying infrastructure fails, for the reason, that the other tape skew determination unit DUS2, DUS1 may take over and at least provide a skew control service sufficient for maintaining the tape storage device operable.

In this regard, the first and the second tape skew determination unit DUS1, DUS2 rely on different measuring principles for determining the skew. This may include that in a first embodiment, one of the tape skew determination units DUS1, DUS2 provides an absolute skew value while the other determination unit DUS2, DUS1 provides a relative skew value. In another embodiment, the tape skew determination units DUS1, DUS2 may rely on different measurement principles, such that, for example, the first tape skew determination unit DUS1 derives the first tape skew value DTS1 from information of two concurrently read servo bands while the other tape skew determination unit DUS2 derives the second tape skew value DTS2 from information read from a single servo band. The single servo band used here may be one of the at least two servo bands that are used for determining the first tape skew value DTS1, or may be a different one. In another embodiment, the two tape skew determination units DUS1, DUS2 may differ in the underlying hard- and/or software such that, for example, the first tape skew determination unit DUS1 relies on computing means different from computing means the second tape skew determination unit DUS2 relies on. All these embodiments may be applied individually or in combinations such that a quality of the fail-safe mechanism may be raised.

Figure 5:
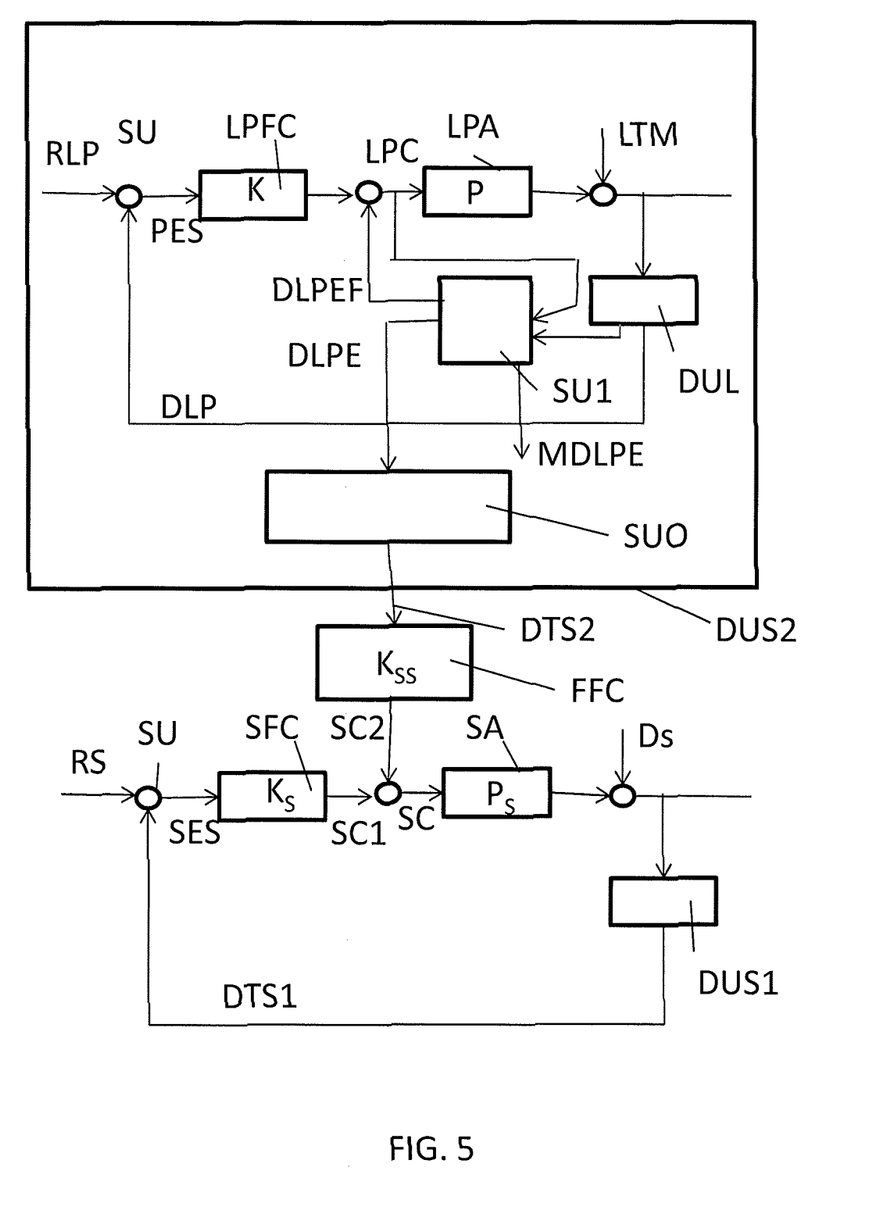
FIG. 5 is a block diagram of an apparatus according to an embodiment of the present invention.

As an example of the second determination unit DUS2, it is referred to FIG. 5. FIG. 5 illustrates a block diagram of a sample second determination unit DUS2. The second determination unit DUS2 basically makes use of the closed loop lateral position control system of FIG. 3 and uses the information gathered there. With respect to the elements, functions and operation of the closed loop lateral position control system it is referred to the description associated with FIG. 3. Again, the lateral position determination unit DUL may be based on reading a single servo band and determining the lateral position information from the read servo information. However, such lateral position information in form of lateral position values DLP allows also for estimating a value related to skew wherein the following is denoted as second tape skew value DTS2.

Figure 6:
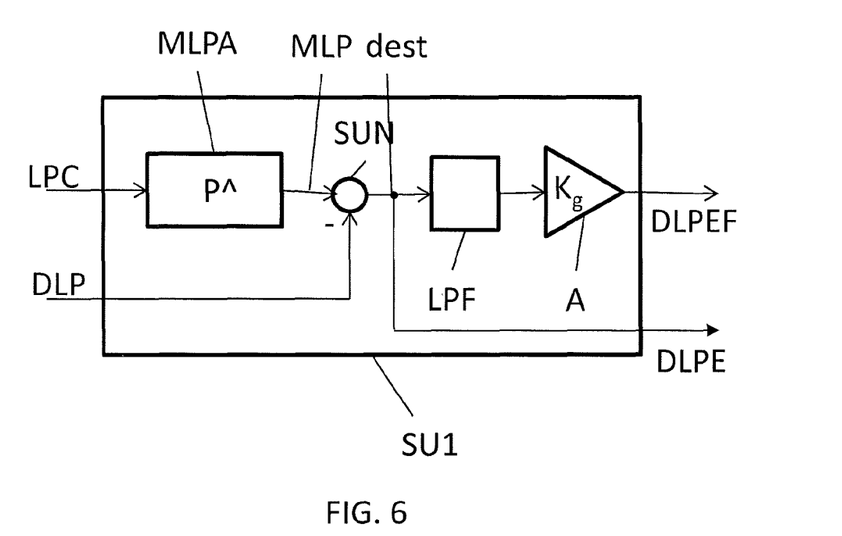
FIG. 6 is a block diagram of a disturbance observer as used in the apparatus of FIG. 5.

For this purpose, a subunit SU1 is added to the closed-loop lateral position control system. The subunit SU1 may also be called "disturbance observer". The disturbance observer SU1 provides a lateral tape position estimate DLPE and a filtered and amplified lateral tape position estimate DLPEF. For this purpose the disturbance observer SU1 comprises a model MLPA of the lateral position actuator LPA used in the control-loop for controlling a lateral position of the tape head TH. Such model MLPA may be represented by a transfer function $P^\wedge$ modeling the transfer function P of the lateral position actuator LPA as can be derived from the disturbance observer SU1 according to FIG. 6. This disturbance observer SU1 uses the lateral position control signal LPC and the lateral position value DLP as measured/determined by the lateral position determination unit DUL as input. A deviation $d_{est}$ between the determined lateral position value DLP and a modeled lateral position value MLP is determined at the subtraction unit SUN. The output $d_{est}$ at the disturbance observer SU1 represents an estimated lateral tape position estimate DLPE. Hence, the disturbance observer SU1 provides an estimate of the lateral tape motion at each time instant that is used to estimate the tape skew. The deviation $d_{est}$ is filtered by the low pass filter LPF and amplified by amplifier A with a transfer function $K_g$ to provide a filtered and amplified lateral tape position estimate DLPEF to form the lateral position control signal LPC.

According to FIG. 5, a another subunit SUO is provided for finally determining the second tape skew value DTS2 dependent on at least two lateral positions estimations DLPE estimated by means of the subunit SU1 consecutive in time. These values are used in the other subunit for determining the second tape skew value DTS2 according to formula $$DTS2 \sim \theta = \arcsin\{(d_{est}(t2) - d_{est}(t1))/(v\Delta t)\}. \quad (F2)$$

The second tape skew value DTS2 represents a tape skew estimated by means of the closed-loop lateral position control system, the disturbance observer SU1 and the other subunit SUO for determining the skew angle θ—which is an absolute skew angle in the present example. The second tape skew value DTS2 is then applied via a feed-forward controller FFC with a transfer function $K_{ss}$ according to FIG. 5, which can be based on an inverse-model of the skew actuator, to the closed-loop skew control system according to FIG. 4, which entire block diagram is shown in FIG. 5. Accordingly, the feed-forward system is used to enhance the closed-loop skew control system, which is also denoted as skew feedback control system. The advantage in this case is that the combination of the feed-forward controller FFC and the skew feedback controller SFC provides an improved performance compared to a stand-alone skew feedback controller SFC. A second skew control signal SC2 as output of the feed forward controller FFC is added to the first skew control signal SC1 such the skew actuator SA is controlled subject to a skew control signal SC that is dependent on the first skew control signal SC1 and the second skew control signal SC2.

In addition, the control unit SU1 may provide a moving average of the estimated lateral tape position MDLPE.

In a further embodiment, the tape skew estimate used by the feed-forward controller is obtained by using a lateral position measurement by means of a dedicated sensor, for example, by means of an optical sensor which may be placed in the tape path prior to the tape head. In an example making use of such a dedicated sensor for determining lateral position information of the tape, at least one tape edge of the tape is observed. At least two consecutive lateral tape positions are determined dependent on the at least one observed tape edge. This facilitates a reliable determination of the current lateral tape position by other means than reading the servo information. Hence, the second tape skew determination unit DUS2 may, instead of obtaining information from a single servo band, use information provided by such one or more optical sensors for monitoring the tape edge E as will be shown in FIG. 7. A first sensor S1 at a first longitudinal position x1 and a second sensor S2 at a second longitudinal position x2 are associated to the tape path as shown in FIG. 7. Both sensors S1, S2 may be optical sensors, as for example light barriers, photo detectors or an array of photo detectors. Subject to the tape edge position, the tape edge may obstruct a part of the light beam emitted from the photodiode and therefore provides a measure of the lateral position of the tape, in this example. The first and the second sensor S1, S2 are positioned on opposite sides of the tape head TH with respect to the longitudinal direction X. Furthermore, the first sensor S1 and the second sensor S2 are positioned on opposite sides of the first and the second tape rollers RR2, RR1. A first longitudinal distance L1 represents a distance between the first longitudinal position x1 and the tape head TH. A second longitudinal distance L2 represents a distance between the second longitudinal position x2 and the tape head TH. A further first longitudinal distance L1* represents a distance between the first longitudinal position x1 and a further first longitudinal position x1* of the first tape roller RR1. A further second longitudinal distance L2* represents a distance between the second longitudinal position x2 and a further second longitudinal position x2* of the second tape roller RR2. Each sensor S1, S2 is operable to observe a tape edge E. The first sensor S1 is further operable to provide a first output sensor signal dependent on the observed tape edge E. The first output sensor signal represents a first lateral tape position $y_{x1}(t)$ with respect to a predetermined reference point REF at the first longitudinal position x1. The second sensor S2 is operable to provide a second output sensor signal dependent on the observed tape edge E. The second output sensor signal represents a second lateral tape position $y_{x2}(t)$ with respect to a predetermined reference point REF at the second longitudinal position x2. The reference point REF may by way of example be a lateral position of the first and second sensor S1, S2. The first longitudinal position x1 and the second longitudinal position x2 are also identified as longitudinal capture positions. Such lateral position of the tape, in the previous embodiments also denoted as DLPE, allows for a determination of the tape skew by means of a subunit which may be identical to the other subunit in the previous embodiment, i.e. a subunit which derives the skew angle by means of triangulation from two consecutive longitudinal position values. The remaining system is as shown in the context of FIG. 5.

The above embodiment is beneficial in that two different hardware sets are used for determining the first and the second tape skew determination values DTS1 and DTS2 which may improve the fail-safe mechanism of the apparatus. A further advantage is that the optical sensor measurement provides advance information on the tape skew, as one of the subject sensors, depending on the tape transport direction, provides information ahead of such information being accessible at the tape head TH.

An advantage of the above system is apparent when assuming that, for example, one or more of the servo channels—i.e. servo band and associate read functionality—are not operational either temporarily or permanently. Then the second tape skew determination unit DUS2 can be used in a stand-alone mode and the tape storage device remains functional.

It was observed that when the second tape skew determination unit DUS2 was used in a stand-alone mode, the resulting skew may be offset when compared to a skew controlled by means of the skew feedback controller SFC when operative. Thus, it is desired to compensate for such skew offset while in feed-forward control. The skew offset may have two main components: A DC offset component and a slowly varying offset component: The DC offset component may appear mainly due to an initial tilt of the tape head. The slowly varying offset component may appear mainly due to slow variations of the direction of tape motion, for example due to tape packing irregularities on a reel and/or other tape path characteristics.

In an embodiment of the present invention, the DC offset component may be compensated by making use of information from the skew feedback controller SFC when operative. By making use of this information, the performance of the feed-forward control system may be enhanced by compensating for the DC offset in the second skew control signal SC2 from the feed-forward controller FFC. Basically, this embodiment makes use of an average value of the first skew control signal SC1 as long as the feedback skew control system is in operation and not failing. It was found that the average of the first skew control signal SC1 may be used as a value for compensating for the DC offset component in the second skew control signal SC2 when the feed-forward system is operating stand alone, and hence the second skew control signal SC2 is the only one acting on the skew actuator SA.

Figure 4:
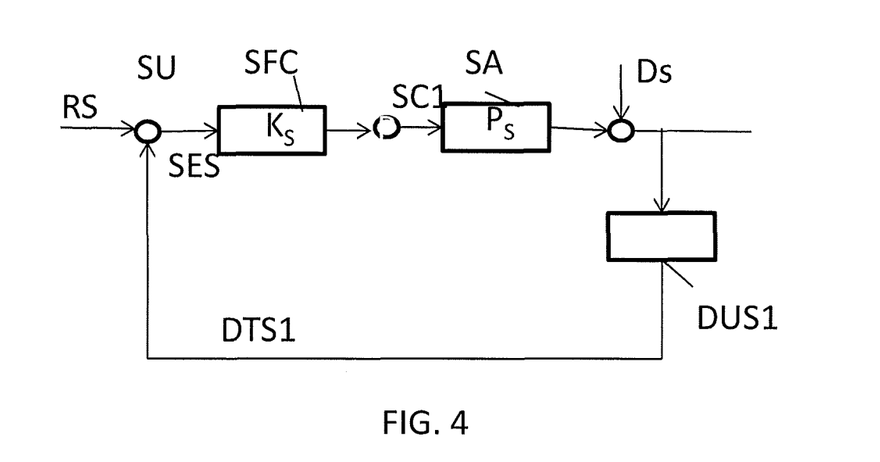
FIG. 4 is a block diagram of a closed-loop skew control system as used in an exemplary embodiment of the present invention.
Figure 8:
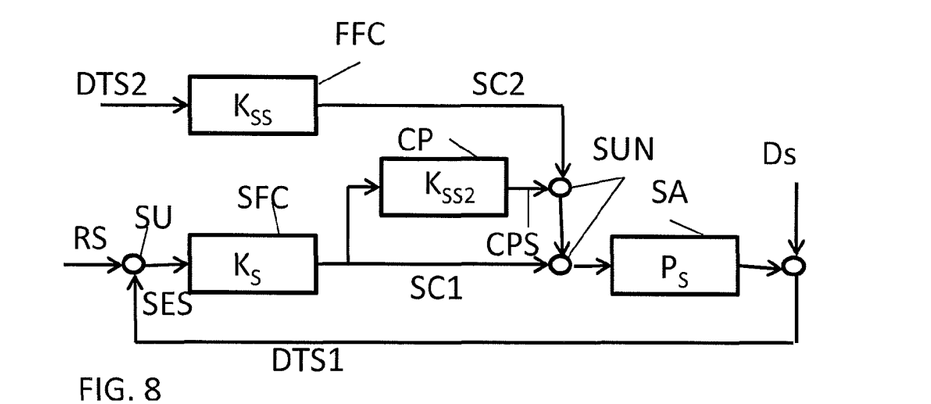
FIG. 8 is a block diagram of an apparatus according to an embodiment of the present invention.

This embodiment is represented in the block diagram of FIG. 8 which basically shows the closed loop feedback skew control system of FIG. 4 plus a feed-forward control system, which may, for example, be represented by the second skew determination unit DUS2 of FIG. 5 supplying the second skew determination value DTS2 which is input to a feed-forward controller FFC with a transfer function $K_{SS}$. The feed-forward controller FFC supplies the second skew control signal SC2 which is added to the first skew control signal SC1 of the skew feedback controller SFC during normal operation. The average of the first skew control signal SC1 is represented by a moving average of the first skew control signal SC1 during operating feedback skew control system. The moving average is represent by the average of the latest N samples of the first skew control signal SC1 with N>2, and more specifically, N>20. At least the latest moving average of the first skew control signal SC1 is stored in a memory of the tape storage system. This functionality is represented by the compensator CP in FIG. 8 with a transfer function $K_{SS2}$. The compensator CP provides a compensation signal CPS in case the control-loop feedback skew system fails. This may be detected by suitable means, e.g. by detecting a loss of sync from one of the servo channels or by other means. Once such failure is detected, the compensator CP supplies the compensation signal CPS, which in one embodiment is the latest moving average of the first skew control signal SC1, to the adding unit SUN where the compensation signal CPS is added to the second skew control signal SC2 from the feed forward controller FFC. This implies that the compensator CP supplies a zero compensation signal CPS in case the feedback skew control system is operational. Switching in the compensation signal CPS in case of a failure may also be accomplished by the adding unit SUN which may only add the compensation signal CPS to the second skew control signal SC2 in case of a failure. In this embodiment, the compensator CP may continuously provide a non-zero compensation signal CPS representing the latest moving average value of the first skew control signal SC1 even if the feedback skew control system is fully operational. In this embodiment, the adding unit SUN may be understood as a part of the compensator CP.

In an exemplary embodiment, there are two moving averages of the first skew control signal SC1 determined of which the latest moving average is stored each in the memory. The first moving average represents the moving average of the first skew control signal when the tape is moved in a forward direction while the second moving average represents the moving average of the first skew control signal SC1 when the tape is moved in the reverse direction, i.e. opposite to the forward moving direction. Here, the static skew offset may be compensated subject to the moving direction of the tape.

Another embodiment tackles the problem of determining the moving average of the first skew control signal SC1 upon entering a tape cartridge into the tape drive and starting operation of the tape storage system such that no previous values of the first skew control signal are available for determining a moving average in a sensible way. In such situation, the offset compensation may not compensate sufficiently. Hence, at cartridge unload, the latest moving average value of the first skew control signal SC1 is stored in a non-volatile memory and may be fetched at a subsequent load of a cartridge and used as initial moving average of the first skew control signal SC1.

In case the non-volatile memory does not have such information available, which may be the case at time zero after manufacturing, i.e. at the very initial load of a cartridge into the tape drive, a calibration routine is run to compute a moving average value that can be stored in the non-volatile memory and may be used when operating the tape drive for the first time. The calibration routine may move the tape in the tape drive for determining a moving average of the first skew control signal when such movement is in a steady state.

Hence, by all these embodiments, the second skew control signal SC2 is compensated by an average of the first skew control signal SC1 which compensates for a static offset in the second skew control signal SC2. While the feedback skew control system generates the first skew control signal SC1, a moving average of the first skew control signal is computed and stored into a memory. In case the feed-forward control system provides a standalone second control signal to the actuator, the compensator CP adds the most recent average of the first skew control signal to the second skew control signal. The moving average value is added/subtracted to the second skew control signal only in case of a failure of the feedback skew control system, and as soon as such failure is detected. The triggering point in time for applying the compensation signal may be immediate upon detecting the failure, or upon a switching over from the feedback skew control system to the feed-forward control system.

Figure 9:
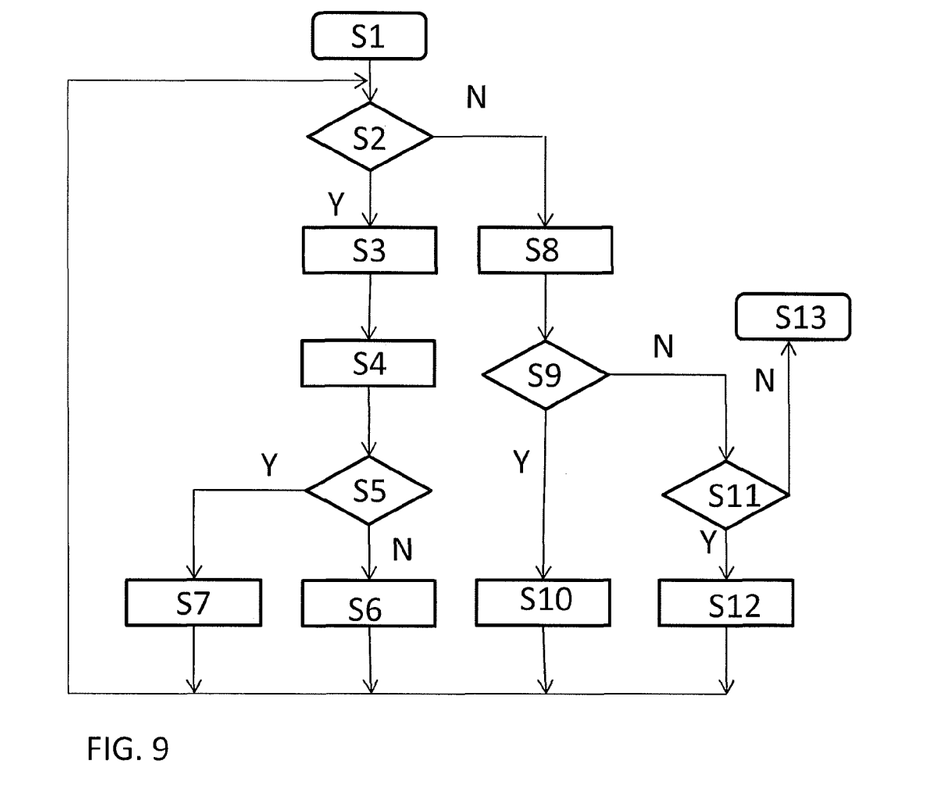
FIG. 9 is a flowchart according to an embodiment of the present invention.

FIG. 9 illustrates a flow chart of a method for operating a tape storage device according to an embodiment of the present invention, and is based on the compensation model as described in connection with FIG. 8. In operation S1 the method is started. In operation S2, it is verified if multiple information from multiple servo channels is available or not. This criterion represents the verification if the feedback skew control system/loop is operative or not since this feedback skew control system/loop requires at least two servo channels being operative. If multiple servo channels are operative (Y), the first skew control signal is computed in operation S3. Else (N), in operation S8 the feed-forward control system is activated. In operation S4, after computing the first skew control signal, an average of the first skew control signal is determined. In operation S5, it is verified in which direction—forward or reverse—the tape is currently moved. In case the tape is moved forward (Y), the determined average value of the first skew control signal is stored in a non-volatile memory and assigned to the forward tape motion direction, and the method continues with operation S2. In case the tape is moved reverse (N), the determined average value of the first skew control signal is stored in a non-volatile memory and is assigned to the reverse tape motion direction, and the method continues with operation S2.

In case the skew control includes the feed-forward control system in operation S2 (N), the second skew control signal is updated but not yet output to the skew actuator in operation S8. In operation S9, it is verified if a latest average of the first skew control signal is available or not. If it is available (Y), the compensation signal is set to the average of the first skew control signal and is added to the second skew control signal in operation S10 and as such acts on the actuator. The method then continues with operation S2. In case there is no average of the first skew control signal available in operation S9, it is verified in operation S11, if information as to an average value is available in a non-volatile memory or not. If yes (Y), the stored average value represents the compensation signal which is added to the second skew control signal in operation S12. Else (N), the skew control is exited in operation S13, an error is reported, and possibly an error recovery procedure is started.

In addition to the above embodiments, or alternatively, data channel information may be used for determining the compensation signal. Data written to a data band may allow determining a skew value, too, which in the following is denoted as third skew value, and which third skew value may represent the compensation signal or a contribution to the compensation signal for the second skew control signal SC2.

In this embodiment, if data has been written to tape before the present skew control mechanism is applied, the third skew value, which may represent the skew of data channels, may be identified by measuring relative data channel skew from synchronization field displacements between data channels.

Figure 10:
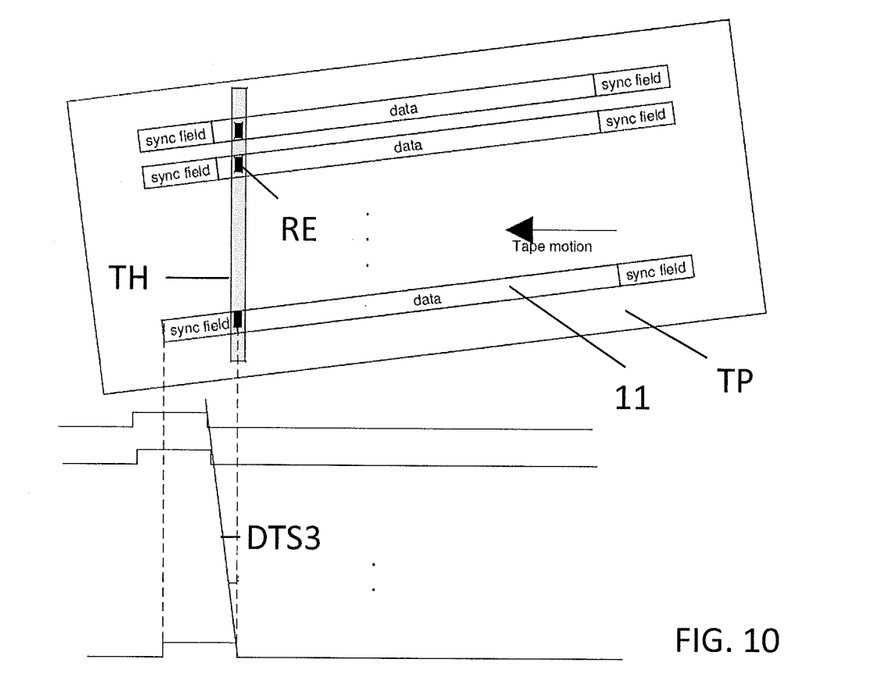
FIG. 10 is another illustration of a tape path in a tape drive.

If data has been written to tape before with negligible skew, the skew between the tape head and the tape can be measured as third skew value DTS3 by utilizing the detection by the data channels of synchronization fields embedded into the data streams, as indicated in FIG. 10. In the portion of the tape TP illustrated in FIG. 10, multiple data tracks 11 are provided each of which data track 11 is detected by a data channel containing logic for reading and/or writing data from/to the data track 11. In particular, each data channel contains logic to detect the presence of synchronization fields in the data streams read from individual data tracks 11. The synchronization fields are normally written simultaneously onto all data tracks 11, such that they are physically aligned in the absence of skew during the write process. During readback, time differences between the detection of the synchronization fields in the data streams read from the data tracks 11 can be measured. The signals over time illustrated in the bottom portion of FIG. 10 represent such data channel synchronization field detection for the individual data tracks 11 in case of a skew of the tape TP. The timing between the individual synchronization fields detected may be translated into a third skew value DTS3 using the knowledge of a time difference $\Delta t_{ij}$ between the synchronization field detection on data channels i and j with $0 \leq i,j < N$, a tape speed v, and a distance between data read elements RE of the tape head TH. Third skew value estimates from various pairs of data channels can be averaged in several ways to get a more reliable third skew value estimate.

Figure 12:
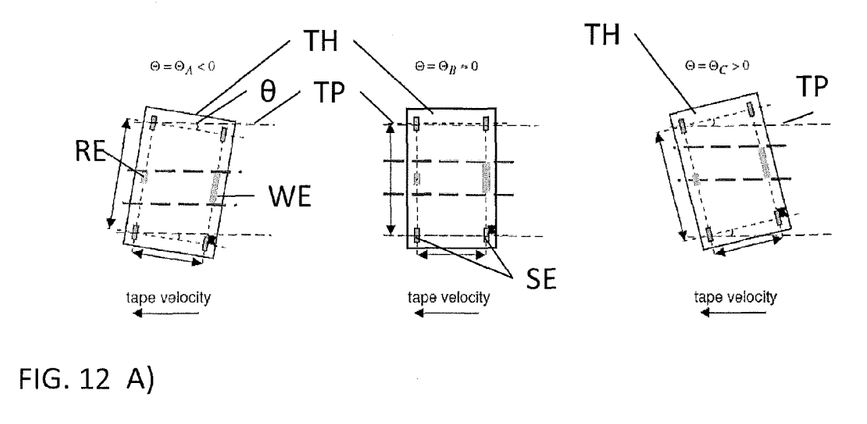
FIG. 12 illustrates a read-after-write operation is performed, with FIG. 12 A) illustrating three skew configurations between the tape head and the tape and FIG. 12 B) illustrating the corresponding signal to noise ratio characteristic.

In case no data has been written to the tape TP yet, a calibration procedure writes data to the tape TP and does a read verification during the write operation. While doing so, i.e., while writing the data to the data tracks, the skew angle of the tape head with respect to the tape may be varied on purpose, and an error rate or a signal to noise ratio SNR may be monitored as a function of the adjusted skew angle. For example, data is written to the tape TP while the skew angle is varied between a minimum and maximum value, as shown in FIG. 12, and a read-after-write operation is performed. While FIG. 12 A) illustrates three skew configurations between the tape head TH and the tape TP with skew angles $\theta_A$, $\theta_B$, and $\theta_C$, FIG. 12 B) illustrates the corresponding signal to noise ratio SNR characteristic. On the tape head TH, read elements are indicated by RE and write elements are indicated by WE, while servo elements are denoted by SE. Given the tape motion as indicated, the data may first be written by the write element WE and immediately read when reaching the read element RE of the tape head TH. A quality of this read-after-write process is determined by a read margin, which depends on the skew angle $\theta_A$, $\theta_B$, and $\theta_C$, as will become apparent from FIG. 12. By monitoring the signal to noise ratio SNR or an error rate at the output of the read channels, it is therefore possible to determine an estimate of the skew angle $\theta_A$, $\theta_B$, and $\theta_C$. In the present embodiment, the third skew angle DTS3 is determined by means of selecting the skew angle at which the signal to noise ratio SNR is maximized or the error rate is minimized. A deviation of that position from a nominal head skew position provides the static skew that represents the third skew value DTS3 which in turn may be used as compensation signal.

Even though the DC offset compensation improves substantially the second skew control signal, there is some residual error in some cases due to a skew offset slowly varying over time. For the case of a slowly varying skew offset, an applied method makes use of lateral motion information provided by a disturbance observer or an optical edge sensor, as is introduced, for example, with respect to FIG. 5. Referring to FIG. 5, the control unit SU1 of the second tape skew determination unit DUS2 determines estimates of lateral tape position errors DLPE as is explained with respect to FIG. 5. In addition, the control unit SU1 may calculate a moving average of the estimated lateral tape motion disturbance MDLPE over a fixed number N of samples. A difference of the latest averaged values MDLPE may be multiplied with an appropriate gain, such as a DC gain of the track-follow actuator. Since the estimate is slowly changing, only the DC gain may be applied and not the complete transfer function of the track-follow actuator. The result may be included in the compensation signal CPS for compensating for a dynamic offset in the second skew control signal SC2.

Estimates of the lateral tape motion errors DLPE can also be derived from the output of the track-follow controller in case a disturbance observer is not available or directly from an optical edge sensor measurement. Next, a moving average of the DLPE is calculated as MDLPE over a fixed number of N samples. A difference of two consecutive values of MDLPE is calculated. Finally, the slowly varying skew offset is calculated by dividing with the time difference between the consecutive MDLPE and the tape speed.

Figure 11:
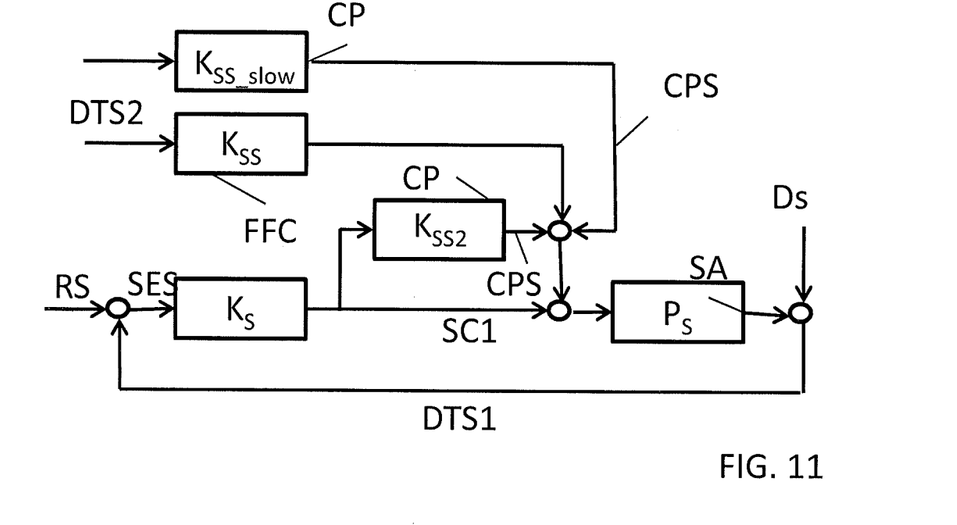
FIG. 11 is a block diagram of an apparatus according to an embodiment of the present invention.

FIG. 11 shows a block diagram of a tape storage system according to an embodiment of the present invention in which the system of FIG. 9 is enhanced by the compensation of a slowly varying offset component in the second skew control signal SC2. Schematically, the compensator CS additionally provides for a box representing a transfer function $K_{ss\_slow}$ which provides another compensation signal CPS added to the second skew control signal SC2.

Note that any of the two proposed embodiments for the static DC offset compensation can be used along with the slowly varying offset compensation.

As will be appreciated by one skilled in the art, aspects of the present invention may be embodied as a system, method or computer program product. Accordingly, aspects of the present invention, in particular in form of the controller, may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention, such as the read and write methods, may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. Apparatus for operating a tape storage device, comprising:
   a first tape skew determination unit configured to provide a first tape skew value concerning a skew of a tape in the tape storage device;
   a second tape skew determination unit configured to provide a second tape skew value concerning the skew of the tape;
   an actuator for adjusting one or more of:
      a rotational orientation of a tape head of the tape storage device, which tape head is provided for reading and/or writing data from/to the tape, and
      a motion direction of the tape;
   a skew feedback controller for converting a deviation of the first tape skew value from a reference skew value into a first skew control signal for controlling the actuator;
   a feed-forward controller for converting the second tape skew value into a second skew control signal for controlling the actuator; and
   a compensator for determining at least one compensation signal for the second skew control signal.

2. The apparatus according to claim 1, wherein the compensator is adapted to add the at least one compensation signal to the second skew control signal in case of the first skew control signal failing.

3. The apparatus according to claim 1, wherein:
   the compensator is adapted to determine an average of the first skew control signal; and
   the at least one compensation signal is dependent on the average of the first skew control signal, and on a most recent value of a moving average of the first skew control signal that is determined by the compensator.

4. The apparatus according to claim 3, wherein:
   the compensator is adapted to determine a first moving average of the first skew control signal for a forward direction of the tape motion, and a second moving average of the first skew control signal for a reverse direction of the tape motion; and the at least one compensation signal is dependent on the first moving average of the first skew control signal for the forward direction of the tape motion and the second moving average of the first skew control signal for the reverse direction of the tape motion.

5. The apparatus according to claim 1, wherein:
the compensator is adapted to determine a third tape skew value by means of evaluating a time difference between an detection of synchronization information on multiple different data channels; and
the at least one compensation signal is dependent on the third tape skew value.

6. The apparatus according to claim 1, wherein:
the first tape skew determination unit is adapted to determine the first tape skew value based on servo information read from at least two servo bands of the tape, which servo information is prewritten to the at least two servo bands for allowing to determine a lateral position of the tape;
the determined first tape skew value represents a skew angle between the motion direction of the tape and a rotational orientation of the tape head;
the second tape skew determination unit is adapted to determine the second tape skew value by means of servo information read from a single servo band of the tape, which servo information is prewritten to the servo band for allowing to determine a lateral position of the tape; and
the determined second tape skew value represents a skew angle between the motion direction of the tape and a reference motion direction of the tape.

7. The apparatus according to claim 6, wherein:
the skew feedback controller, the first tape skew determination unit and the actuator contribute to a closed-loop skew control system; and
a transfer function of the feed-forward controller is based on an inverse transfer function of a model of the actuator.

8. The apparatus according to claim 6, wherein:
the second tape skew determination unit comprises a subunit for estimating a lateral tape position by means of a model of a lateral position actuator for controlling a lateral position of the tape head, and for determining a moving average of the estimated lateral tape position; and
wherein the at least one compensation signal is dependent on at least two consecutive moving average estimated lateral tape positions.

9. The apparatus according to claim 1, wherein the second tape skew determination unit further comprises:
an optical detector configured to detect a lateral position of the tape; and
a subunit configured to estimate a moving average of the detected lateral position of the tape;
wherein the at least one compensation signal is dependent on at least two consecutive moving average estimated lateral tape positions.

10. A method for operating a tape storage device comprising a tape head for reading and/or writing data from/to a tape in the tape storage device, the method comprising:
determining a first tape skew value concerning a skew of the tape and converting the first tape skew value into a first skew control signal by means of a skew feedback controller;
determining a second tape skew value concerning the skew of the tape, and converting the second tape skew value into a second skew control signal by means of feed-forward controller;
determining at least one compensation signal for the second skew control signal; and
controlling at least one of: a rotational orientation of the tape head, and a tape motion direction of the tape, dependent on the second skew control signal and the compensation signal in case the first skew control signal fails.

11. The method according to claim 10, further comprising:
determining an average of the first skew control signal during operation of a closed-loop skew control system comprising the skew feedback controller; and
wherein the at least one compensation signal is dependent on the average of the first skew control signal.

12. The method according to claim 11, further comprising:
storing the average of the first skew control signal at unload of a tape cartridge from a tape drive of the tape storage device; and
at load of a tape cartridge into the tape drive, setting the at least one compensation signal to the stored average of the first skew control signal.

13. The method according to claim 10, further comprising:
determining a third tape skew value by evaluating a time difference between an detection of synchronization information on multiple different data channels;
wherein the at least one compensation signal is dependent on the third tape skew value.

14. The method according to claim 10, further comprising:
writing data to the tape;
determining one or more of an error rate and a signal to noise ratio when reading the data written from the tape; and
determining the at least one compensation signal dependent on a tape skew value at a position of the tape at which either the error rate is minimized or the signal to noise ratio is maximized.

15. A computer program product comprising a non-transitory, computer readable medium having computer readable program code embodied therewith, the computer readable program code comprising computer readable instructions that, when executed by a computer, perform a method for operating a tape storage device comprising a tape head for reading and/or writing data from/to a tape in the tape storage device, wherein the method comprises:
determining a first tape skew value concerning a skew of the tape and converting the first tape skew value into a first skew control signal by means of a skew feedback controller;
determining a second tape skew value concerning the skew of the tape, and converting the second tape skew value into a second skew control signal by means of feed-forward controller;
determining at least one compensation signal for the second skew control signal; and
controlling at least one of: a rotational orientation of the tape head, and a tape motion direction of the tape, dependent on the second skew control signal and the compensation signal in case the first skew control signal fails.

16. The computer program product according to claim 15, wherein the method further comprises:
determining an average of the first skew control signal during operation of a closed-loop skew control system comprising the skew feedback controller; and
wherein the at least one compensation signal is dependent on the average of the first skew control signal.

17. The computer program product according to claim 16, wherein the method further comprises:
storing the average of the first skew control signal at unload of a tape cartridge from a tape drive of the tape storage device; and
at load of a tape cartridge into the tape drive, setting the at least one compensation signal to the stored average of the first skew control signal.

18. The computer program product according to claim 15, wherein the method further comprises:
   determining a third tape skew value by evaluating a time difference between an detection of synchronization information on multiple different data channels;
   wherein the at least one compensation signal is dependent on the third tape skew value.

19. The computer program product according to claim 15, wherein the method further comprises:
   writing data to the tape;
   determining one or more of an error rate and a signal to noise ratio when reading the data written from the tape; and
   determining the at least one compensation signal dependent on a tape skew value at a position of the tape at which either the error rate is minimized or the signal to noise ratio is maximized.

* * * * *